(12) United States Patent
Kim et al.

(10) Patent No.: US 8,049,826 B2
(45) Date of Patent: Nov. 1, 2011

(54) LIQUID CRYSTAL DISPLAY DEVICE

(75) Inventors: Kang Woo Kim, Seoul (KR); Yoon Sung Um, Gyeonggi-do (KR); Dong Gi Seong, Gyeonggi-do (KR); Seon Ah Cho, Busan-si (KR)

(73) Assignee: Samsung Electronics Co., Ltd. (KR)

( * ) Notice: Subject to any disclaimer, the term of this patent is extended or adjusted under 35 U.S.C. 154(b) by 1021 days.

(21) Appl. No.: 11/975,994

(22) Filed: Oct. 22, 2007

(65) Prior Publication Data
US 2008/0129706 A1 Jun. 5, 2008

(30) Foreign Application Priority Data

Dec. 4, 2006 (KR) .................. 10-2006-0121184

(51) Int. Cl.
*G02F 1/1335* (2006.01)
*G02F 1/1333* (2006.01)
(52) U.S. Cl. .......................................... 349/12; 349/56
(58) Field of Classification Search .................... 349/12, 349/110, 141; 345/73
See application file for complete search history.

(56) References Cited

U.S. PATENT DOCUMENTS

| 6,281,952 | B1 * | 8/2001 | Okamoto et al. | 349/12 |
| 6,798,483 | B2 | 9/2004 | Lee et al. | |
| 7,557,869 | B2 * | 7/2009 | Bang et al. | 349/12 |
| 7,675,580 | B2 * | 3/2010 | Rho | 349/12 |
| 2006/0109222 | A1 * | 5/2006 | Lee et al. | 345/88 |
| 2007/0013819 | A1 * | 1/2007 | Pak et al. | 349/12 |
| 2009/0180043 | A1 * | 7/2009 | Rho et al. | 349/12 |

FOREIGN PATENT DOCUMENTS

| JP | 11231344 A | 8/1999 |
| JP | 2001075074 A | 3/2001 |
| JP | 2005156899 A | 6/2005 |

* cited by examiner

*Primary Examiner* — Dung T. Nguyen
(74) *Attorney, Agent, or Firm* — Innovation Counsel LLP (57) ABSTRACT

A liquid crystal display device for preventing light leakage includes a display substrate having gate and data lines arranged in a matrix format and an image display device connected to the gate and data lines, an opposing substrate bonded to the display substrate with liquid crystals disposed therebetween, a touch sensor operated by a pressurization of the opposing substrate, and a gate shielding line arranged parallel with the gate line on the opposing substrate to cut off an electric field caused by the gate line.

18 Claims, 6 Drawing Sheets

LIQUID CRYSTAL DISPLAY DEVICE

CROSS REFERENCE TO RELATED APPLICATIONS

This application claims priority to Korean Patent Application No. 2006-121184 filed on Dec. 4, 2006 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD") device, and more particularly, to a touch panel equipped LCD device. Although the present invention is suitable for a wide scope of applications, it is particularly suitable for preventing light leakage by being provided with a built-in touch sensor and a gate shielding line.

2. Discussion of the Related Art

Generally, a touch panel is an input means, which is provided to an image display such as a cathode ray tube, an LCD, a field emission display, a plasma display panel, and an electroluminescence device, for inputting information in a manner that a user pressurizes a screen by contact force.

The touch panels are classified into a resistance film type and a capacitance type. In the resistance film type touch panel, when a voltage is applied between two opposing conductive layers, a user presses a screen to make the two conductive layers come into contact with each other. A voltage or current variation generated from the contact point is then detected to read a coordinate value of the contact point.

In the capacitance type touch panel, while capacitance charging or discharging iteratively keeps taking place on a transparent conductive film or glass, a small quantity of electric charges is accumulated between the conductive film and a stylus as a pen type input means. The electric charge quantity is detected from an input point to be converted into a coordinate value. Since the capacitance type touch panel is required to supply electricity to the stylus, an analog input resistance type touch panel, which is built in one body of a liquid crystal display panel among flat panel displays, is preferred.

However, light leakage occurs in the touch panel loaded LCD due to a lateral field generated between a gate line and a common electrode. Extending a masking dimension of a black matrix to solve the problem causes another problem, namely that transmissivity or an aperture ratio is reduced.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device, by which an aperture ratio and transmissivity can be enhanced by controlling light leakage with a gate shielding line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an exemplary embodiment of the present invention, a liquid crystal display device includes a display substrate having gate and data lines arranged in a matrix format and an image display device connected to the gate and data lines, an opposing substrate bonded to the display substrate with liquid crystals disposed therebetween, a touch sensor operated by pressing on the opposing substrate, and a gate shielding line arranged parallel with the gate line on the opposing substrate to cut off an electric field caused by the gate line.

In some embodiments, the image display device includes a common electrode receiving a common voltage, a thin film transistor connected to the gate and data lines, and a pixel electrode connected to the thin film transistor to form an electric field with the common electrode.

In some embodiments, the touch sensor includes a first touch conductive line arranged parallel with the data line, a second touch conductive line arranged parallel with the gate line to be insulated from the first touch conductive line, a first touch pad connected to the first touch conductive line, a second touch pad connected to the second touch conductive line to be arranged in the vicinity of the first touch pad, and a conductive spacer electrically connecting the first and second touch pads to each other by pressing on the opposing substrate to supply a touch signal.

The conductive spacer may include a spacer formed on the opposing substrate to be projected in a direction of the display substrate and a conductive layer coated on a surface of the spacer.

In some embodiments, the gate shielding line is provided between the gate line and the common electrode to effectively control a lateral field caused by the gate line.

In some embodiments, gate shielding lines are provided to both sides of the gate line.

In some embodiments, the gate shielding line overlaps a part of the gate line.

In some embodiments, the gate shielding line has a width of 2~4 μm.

The liquid crystal display device may further include a common voltage applying means for applying a common voltage to the gate shielding line.

In another exemplary embodiment, a liquid crystal display device includes a display substrate having gate and data lines arranged in a matrix format and a thin film transistor connected to the data and data lines, an opposing substrate bonded to the display substrate with liquid crystals disposed therebetween, the opposing substrate having a common electrode, a touch sensor operated by a pressurization of the opposing substrate, a pixel electrode formed on the display substrate and connected to the thin film transistor to receive a pixel voltage, and a floating electrode formed on the display substrate to be separated from the pixel electrode.

In some embodiments, the pixel electrode is provided with a floating electrode hole and the floating electrode is provided in an island shape within the floating electrode hole to be spaced apart from the pixel electrode.

In some embodiments, the pixel electrode includes a plurality of leg portions arranged parallel with and spaced apart from each other and a connecting portion connecting the plurality of leg portions to each other, and the floating electrode includes a plurality of island type electrodes formed between the leg portions and spaced apart from the pixel electrode.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
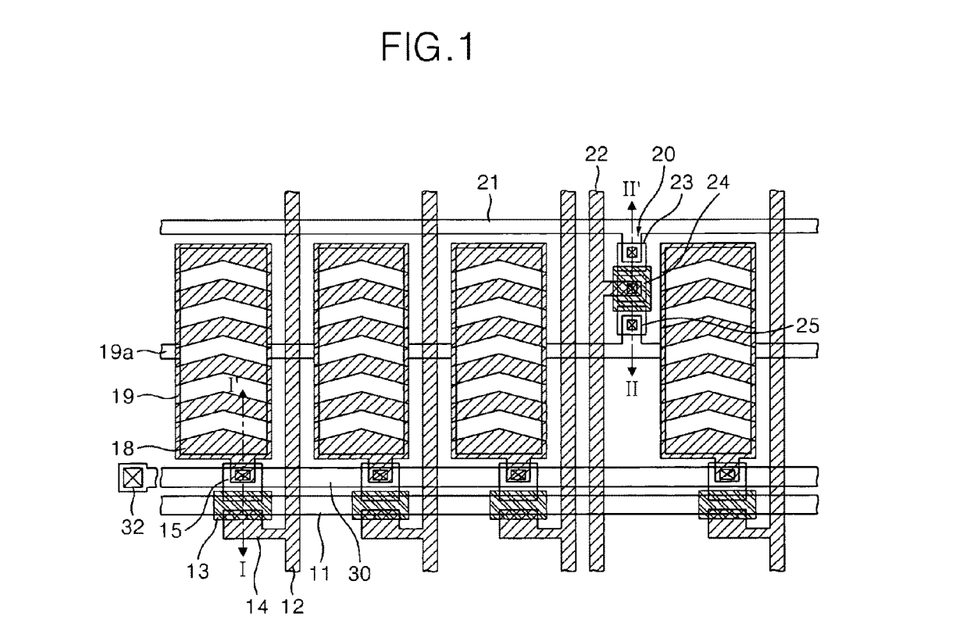
FIG. 1 is a layout of an LCD device according to an exemplary embodiment of the present invention.

An LCD device according to an exemplary embodiment of the present invention is explained with reference to FIGS. 1 to 3 as follows. FIG. 1 is a layout of an LCD device according to an exemplary embodiment of the present invention, FIG. 2 is a cross-sectional diagram taken along line I-I' shown in FIG. 1, and FIG. 3 is a cross-sectional diagram taken along line II-II' shown in FIG. 1.

Figure 2:
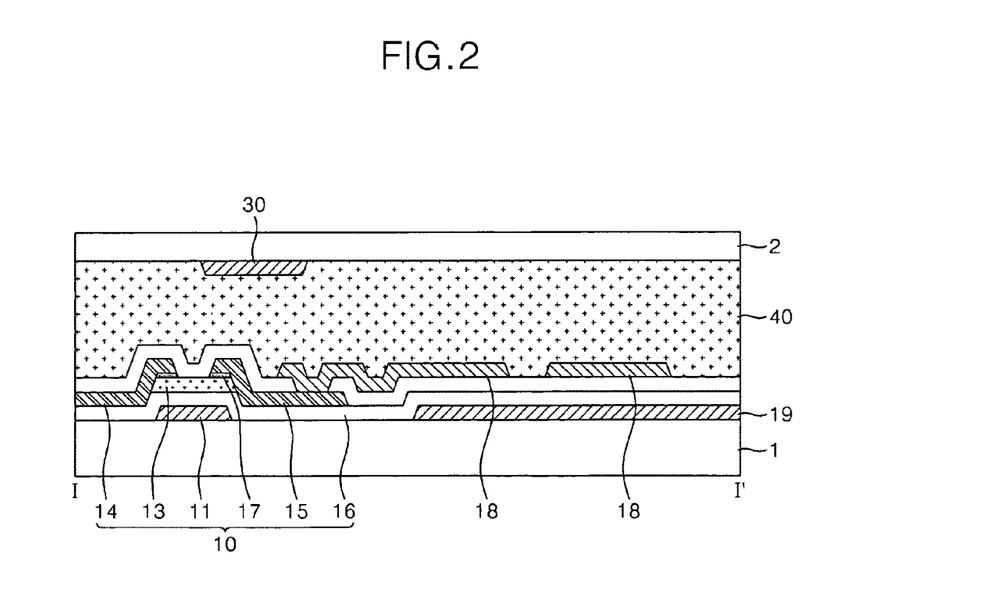
FIG. 2 is a cross-sectional diagram taken along line I-I' shown in FIG. 1.
Figure 3:
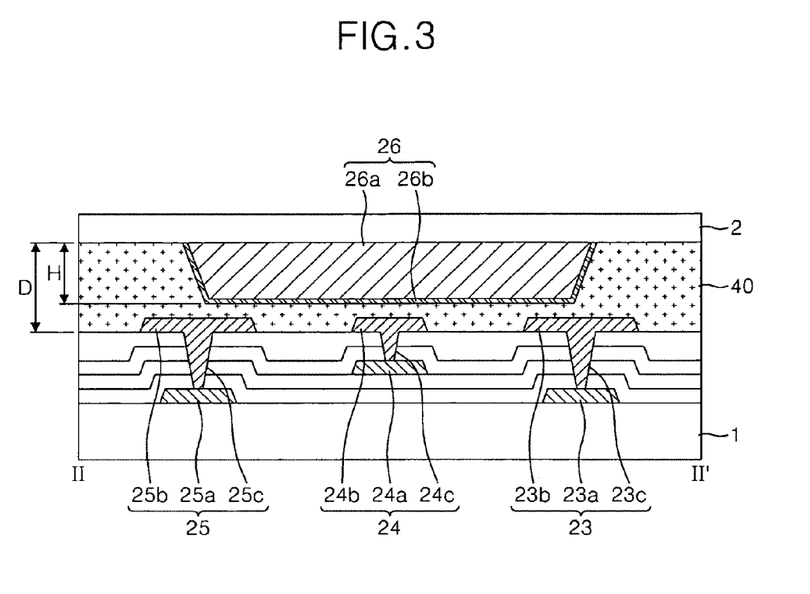
FIG. 3 is a cross-sectional diagram taken along line II-II' shown in FIG. 1.

Referring to FIGS. 1 to 3, an LCD device according to an exemplary embodiment of the present invention includes a display substrate 1, an opposing substrate 2, an image display device 10, a touch sensor 20, and a gate shielding line 30.

The display substrate 1 is provided with a gate line 11, a data line 12, and the image display device 10. The display substrate 1 is generally formed of a transparent insulating substrate such as a glass substrate or a plastic substrate.

A plurality of gate lines 11 is aligned parallel to be spaced evenly spaced apart from each other. A scan signal is applied to the corresponding gate line 11 to drive a thin film transistor. The gate line 11 is formed of a single metal layer or multiple layers. Optionally, the gate line 11 may be configured to have a double-layer structure including a transparent conductive layer and a non-transparent metal layer formed on the transparent conductive layer.

The data line 12 is arranged to be substantially perpendicular to the gate line 11 while insulated from the gate line 11. Like the gate lines 11, a plurality of data lines 12 is aligned parallel with each other. In the present embodiment, since one touch sensor is provided per three sub-pixels, an alignment space for the touch sensor can be provided, as shown in FIG. 1, between the 3rd data line of each group of three data lines 12 and the first data line of the next group of three data lines 12.

The data line 12 is formed of a single metal line or multiple layers like the gate line 11. A pixel signal is applied to the data line 12. And, the pixel signal is applied to a pixel electrode via the thin film transistor.

The thin film transistor includes a gate electrode, a semiconductor layer 13, and source and drain electrodes 14 and 15. The gate electrode is connected to the gate line 11 and controls a turn-on time of the thin film transistor by receiving a scan signal from the gate line 11. The semiconductor layer 13 overlays the gate electrode with a gate insulating layer 16 in between. The semiconductor layer 13 is formed of amorphous silicon or polysilicon. Alternatively, an ohmic contact layer 17 may be further formed on the semiconductor layer 13. In this case, the ohmic contact layer 17 is provided to form ohmic contact between the semiconductor layer 13 and the source or drain electrode 14 or 15.

One end of the source electrode 14 is connected to the data line 12, while the other end thereof overlaps a part of the semiconductor layer 13. Accordingly, a pixel signal from the data line 12 is applied to the source electrode 14 and is then delivered to the drain electrode 15 via a channel formed in the semiconductor layer 13. One end of the drain electrode 15 overlaps a part of the semiconductor layer 13, while the other end thereof is connected to the pixel electrode 18.

A common electrode 19 is formed on the display substrate 1 together with the thin film transistor. A common electrode line 19a, as shown in FIG. 1, is provided parallel with the gate line 11. And, the common electrode 19, as shown in FIG. 2, lies on the same layer where the gate line 11 is located.

The common electrode 19 is formed wide across an entire surface of a pixel area. The common electrode 19 may be patterned to enhance a viewing angle. A reference voltage for driving liquid crystals, i.e., a common voltage is applied to the common electrode line 19a. The common voltage is then supplied to each pixel. In the present embodiment, since the common electrode 19 is formed on the display substrate 1 together with the pixel electrode 18, an electric field generated by the pixel electrode 18 and the common electrode 19 corresponds to a parallel electric field or a fringe field type electric field.

In another embodiment, the common electrode may be formed on the opposing substrate 2. In this alternative case, a vertical electric field or a fringe field type electric field is generated by the pixel electrode 18 on the display substrate 1 and the common electrode on the opposing substrate 2.

The pixel electrode 18, as shown in FIGS. 1 and 2, is connected to the drain electrode 15 and is arranged in the pixel area. In the present embodiment, the pixel electrode 18, as shown in FIG. 1, is configured to have a predetermined cutting pattern. The pixel electrode 18 may have one of various patterns for viewing angle enhancement or lateral visibility enhancement.

Optionally, a color filter may be further formed on the display substrate 1. Alternatively, the color filter may be formed on the opposing substrate. The color filter is provided to display a color per pixel area and includes three colors, red (R), green (G), and blue (B). Sub-pixels having R, G, and B colors constitute one pixel.

The display substrate 1 is provided with a first touch conductive line 21, a second touch conductive line 22, a first touch pad 23, and a second touch pad 24. The first touch conductive line 21, as shown in FIG. 1, runs parallel with the gate line 11 and decides a coordinate value in a vertical direction on the drawing. And, the first touch conductive line 21 is formed of the same metal as the gate line 11 and the common electrode line 19a on the same layer as the gate line 11 and the common electrode line 19a.

The first touch pad 23 contacts with the first touch conductive line 21 and comes into contact with a conductive spacer 26 of the opposing substrate by pressing on the opposing substrate 2. In the present embodiment, the first touch pad 23 includes a first lower touch pad 23a and a first upper touch pad 23b. The first lower touch pad 23a, as shown in FIG. 3, is arranged on the same layer as the first touch conductive line 21. The first upper touch pad 23b comes into contact with the lower touch pad 23a via a contact hole 23c and is placed over the first lower touch pad 23a. Thus, the first upper touch pad 23b is provided to match a height with the second touch pad 24 that will be explained later.

The second touch conductive line 22, as shown in FIG. 1, is parallel with the data line 12. The second touch conductive line 22 decides a coordinate value in a horizontal direction on the drawing. The second touch pad 24 contacts with the second touch conductive line 22. Like the first touch pad 23, the second touch pad 24 includes a second lower touch pad 24a and a second upper touch pad 24b.

The second lower touch pad 24a, as shown in FIG. 3, is formed of the same metal as the data line 12 on the same layer as the data line 12. The second upper touch pad 24b comes into contact with the second lower touch pad 24a via a contact hole 24c. And, the second upper touch pad 24b, as shown in FIG. 3, is arranged at the same height as the first upper touch pad 23b over the display substrate 1. Simultaneous contacts of the first upper touch pad 23b and the second upper touch pad 24b are facilitated by a conductive spacer 26.

A common electrode pad 25, as shown in FIG. 1 or FIG. 3, is further provided to contact with the common electrode line 19a. The common electrode pad 25 supplies a common voltage, which is a touch signal, to the first and second touch pads 23 and 24. In particular, if the common electrode pad 25 and the first and second touch pads 23 and 24 are simultaneously contacted by the conductive spacer 26, a common voltage is supplied to the first and second touch pads 23 and 24 from the common electrode pad 25. The common voltage is then transferred via the first and second touch lines 21 and 22 to enable a coordinate value of a touched position to be read.

In an embodiment where a common electrode is formed on the opposing substrate, since a common voltage is applied to a conductive layer formed on a surface of a conductive spacer, the common electrode pad is not formed on the display substrate.

In the present embodiment, the common electrode pad 25, as shown in FIG. 3, includes a lower common electrode pad 25a and an upper common electrode pad 25b. The lower common electrode pad 25a is formed on the same layer where the common electrode 19 is formed and is connected to the common electrode line 19a. The upper common electrode pad 25b is connected to the lower common electrode pad 25b via a contact hole 25c. The upper common electrode pad 25b is arranged at the same height as the first or second upper touch pad 23b or 24b to facilitate a contact with the conductive spacer 26.

Figure 4:
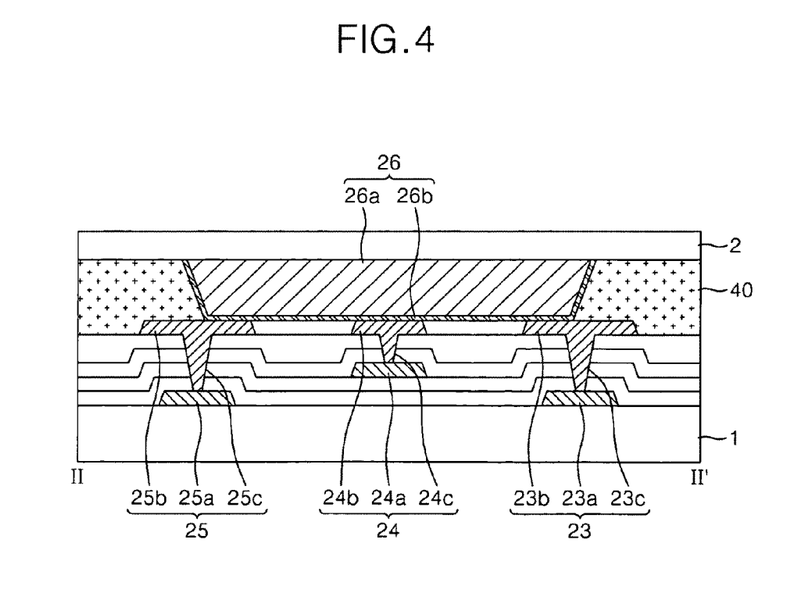
FIG. 4 is a cross-sectional diagram to show a case when an opposing substrate shown in FIG. 3 is pressed.

The gate shielding line 30 and the conductive spacer 26 are formed on the opposing substrate 2. The conductive spacer 26 is an element to configure the touch sensor 20 and applies a touch signal to each of the first and second touch pads 23 and 24 spaced apart from each other. In particular, while the conductive spacer 26, as shown in FIG. 3, maintains an insulated state by being spaced apart from each of the first and second touch pads 23 and 24, if the opposing substrate 2 is pressed, a lower end of the conductive spacer 26, as shown in FIG. 4, simultaneously comes into contact with the first touch pad 23, the second touch pad 24 and the common electrode pad 25 to apply a common voltage of the common electrode pad 25 to each of the first and second touch pads 23 and 24. If so, a coordinate value according to the first and second touch conductive lines 21 and 22 can be recognized.

In the present embodiment, the conductive spacer 26, as shown in FIG. 3, includes a spacer 26a and a conductive layer 26b. The spacer 26a is formed on the opposing substrate 2 to be displaced in a direction toward the display substrate 1. A height H of the spacer 26a should be smaller than a spaced distance D between the opposing substrate 2 and the display substrate 1. In order to raise sensitivity of the touch sensor, the conductive layer 26b is preferably as close as it can be to each of the first and second touch pads 23 and 24 when the conductive layer 26b is not in contact with the first and second touch pads 23 and 24.

The spacer 26a is formed of a conductive polymer such as poly(3,4-ethylenedioxythiophene) (PEDOT), PProDOT-$(CH_3)_2$, or polystyrenesulfonate (PSS) or of an organic insulating substance such as an acryl resin.

The conductive layer 26a is coated on a surface of the spacer 26a, and more particularly, on a lower surface and is formed of a highly conductive metal using sputtering. The area of the conductive layer 26b is dimensioned just enough to cover the first upper touch pad 23b, the second upper touch pad 24b and the upper common electrode pad 25b. It is not preferable to increase the area of the conductive layer 26 to avoid reducing the aperture ratio.

The gate shielding line 30 controls a lateral field generated between the gate line 11 and the common electrode 19. For this, the gate shielding line 30, as shown in FIG. 1 or FIG. 2, is arranged between the gate line 11 and the common electrode 19 on the opposing substrate 2. Preferably, the gate shielding line 30 runs in the vicinity of the gate line 11. Should a slight misalignment take place in the course of bonding the opposing substrate 2 and the display substrate 1 together, the gate shielding line 30 in the vicinity of the common electrode 19 overlaps the common electrode 19, thereby reducing an aperture ratio. Therefore, the gate shielding line 30 may be positioned to run in the vicinity of the gate line 22 to slightly overlap the gate line 11. In the present embodiment, the gate shielding line 30 preferably has a width of 2~4 μm.

Optionally, gate shielding lines may be provided to both sides of the gate line 11.

A common voltage applying means 32, as shown in FIG. 1, is further provided to the LCD device according to the embodiment of the present invention to apply a common voltage to the gate shielding line 30. The common voltage applying means 32, as shown in FIG. 1, is preferably provided to a peripheral part as a non-display area of the opposing substrate 2. In particular, the common voltage applying means 32 includes a common voltage supply pad (not shown) formed on the display substrate 1 to apply the common voltage to the common electrode line 19a, an upper pad (not shown) formed on the opposing substrate 2, and a conductive member (not shown) connecting the common voltage supply pad and the upper pad together.

Finally, a liquid crystal layer 40 is provided between the display substrate 1 and an opposing substrate 2. The liquid crystal layer 40 is driven by an electric field generated by the pixel electrode 18 and the common electrode 19 and displays an image by controlling transmissivity of light passing through the liquid crystal layer 40.

In the present embodiment, it is able to use both vertical field type liquid crystals and horizontal field type liquid crystals. Preferably, the horizontal field type liquid crystals are used for the present invention.

Figure 5A:
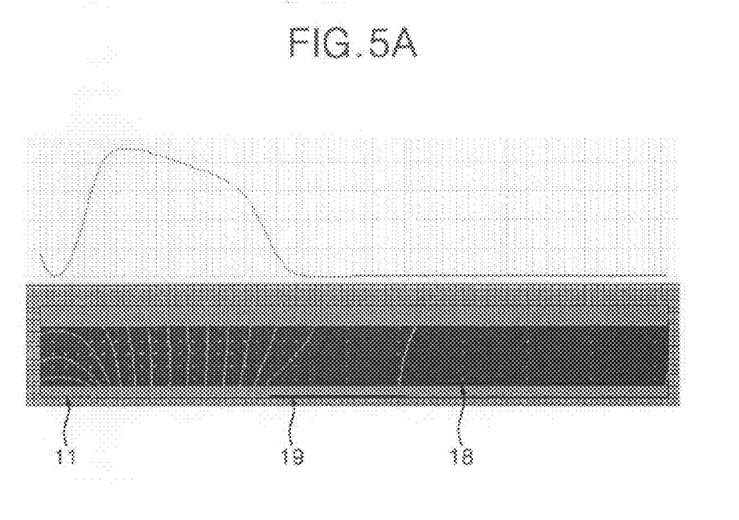
FIGS. 5A to 5C are graphs of simulation results of a lateral field generation in an LCD device according to an exemplary embodiment of the present invention.

Effects of the gate shielding line 30 of the present embodiment are explained with reference to FIGS. 5A to 5C which are graphs of simulation results. FIG. 5A is a graph that shows a lateral field generation without a gate shielding line. Referring to FIG. 5A, it is observed that a lateral field generated between the gate line 11 and the common electrode 19 is formed wide in a direction of and overlapping the common electrode 19. The lateral field causes light leakage.

Figure 5B:
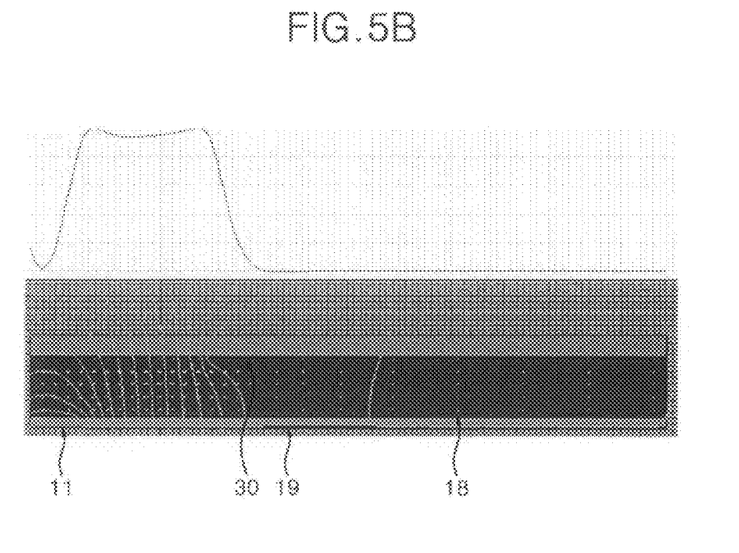

FIG. 5B is a graph of a lateral field generation in an LCD device provided with the gate shielding line 30 of the present embodiment. Referring to FIG. 5B, it is observed that the lateral field generated between the gate line 11 and the common electrode 19 is restricted by the gate shielding line 30. Therefore, even if there is a misalignment between a display substrate and an opposing substrate, a gate shielding line restricts a lateral field to prevent light leakage.

Figure 5C:
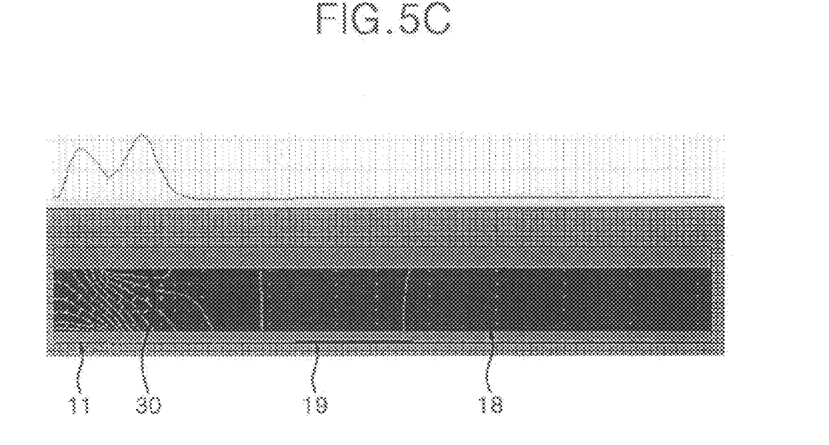

FIG. 5C is a graph of a lateral field generation when the gate shielding line 30 of the present embodiment gets closer to the gate line 11. Referring to FIG. 5C, it is observed that a lateral field generated between the gate line 11 and the common electrode 30 is further restricted by the gate shielding line 30.

Second Embodiment

Figure 6:
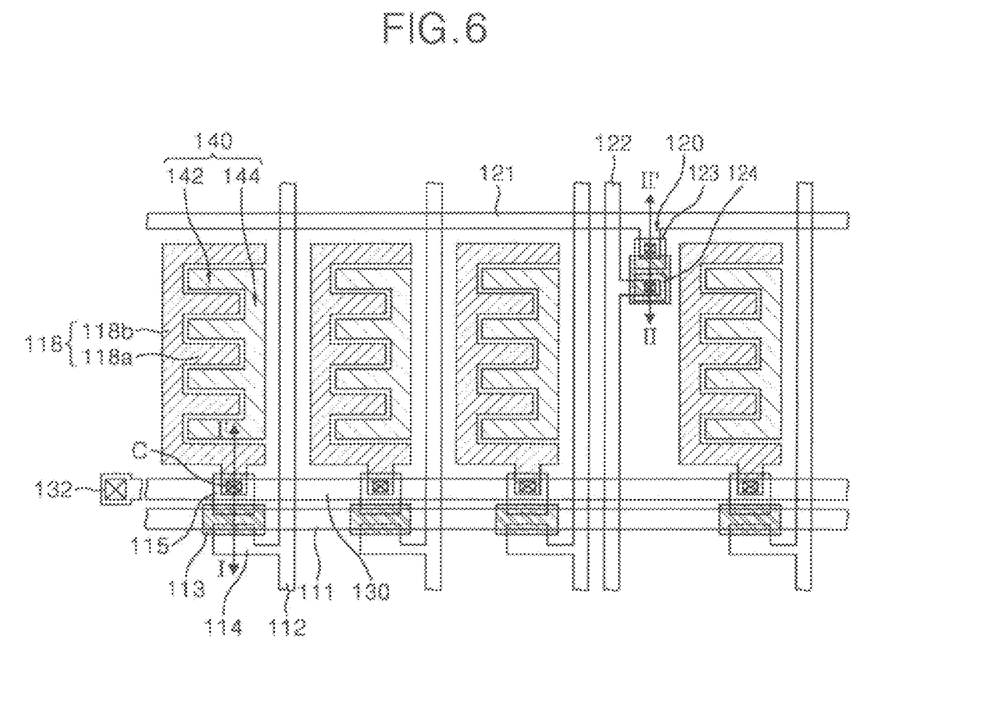
FIG. 6 is a layout of an LCD device according to another exemplary embodiment of the present invention.

An LCD device according to a second exemplary embodiment is explained with reference to FIGS. 6 to 8. FIG. 6 is a layout of an LCD device according to another exemplary embodiment of the present invention, FIG. 7 is a cross-sectional diagram taken along line I-I' shown in FIG. 6, and FIG. 8 is a cross-sectional diagram taken along line II-II' shown in FIG. 6.

Figure 7:
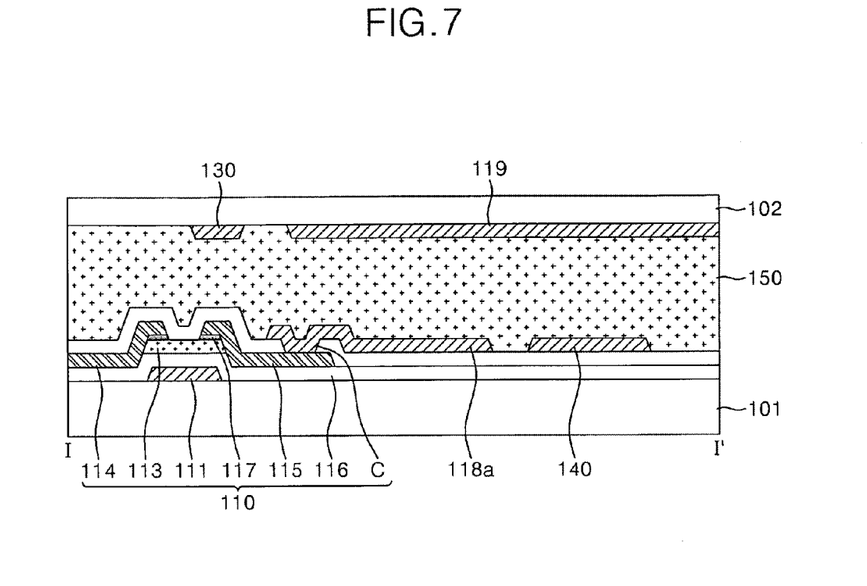
FIG. 7 is a cross-sectional diagram taken along line I-I' shown in FIG. 6.
Figure 8:
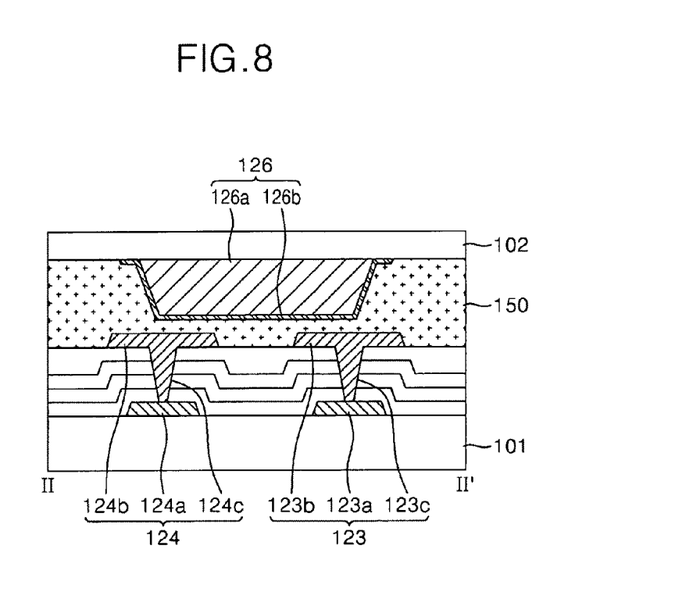
FIG. 8 is a cross-sectional diagram taken along line II-II' shown in FIG. 6.

Referring to FIGS. 6 to 8, an LCD device according to a second exemplary embodiment of the present invention includes a display substrate 101, an opposing substrate 102, a touch sensor 120, a thin film transistor 110, a pixel electrode 118, a common electrode 119, a floating electrode 140, and a gate shielding line 130.

The display substrate 101 provided with a gate line 111, a data line 112 and the thin film transistor 110 is substantially identical to the display substrate 1 of the first embodiment of the present invention, and therefore shall not be re-explained in the following description.

The pixel electrode 118 of the present embodiment is connected to a drain electrode 115 of the thin film transistor 110 and receives a pixel voltage. In the present embodiment, the pixel electrode 118, as shown in FIG. 6, includes a leg portion 118a and a connecting portion 118b. A plurality of leg portions 118a is arranged parallel with and spaced apart from each other. The connecting portion 118b connects the plurality of leg portions 118a into one electrode 118. One end of the connecting portion 118b, as shown in FIG. 6, is connected to the drain electrode 115 via a contact hole C.

The floating electrode 140, as shown in FIG. 6 or FIG. 7, is arranged on the same layer where the pixel electrode 118 is located to be spaced apart from the pixel electrode 118. No voltage is applied to the floating electrode 140. An electric field for rotating liquid crystals is generated between the floating electrode 140 and the pixel electrode 118. Hence, the common electrode 119 is arranged on the opposing substrate 102 instead of being formed on the display substrate 101 and is advantageous in raising transmissivity.

The floating electrode 140, as shown in FIG. 6, is placed in spaces between the plurality of leg portions 118a. The floating electrode 140 includes a bar type electrode 142 provided to each of the spaces between the leg portions 118a. The bar type electrodes 142 may be connected to each other by a connecting electrode 144.

Figure 9:
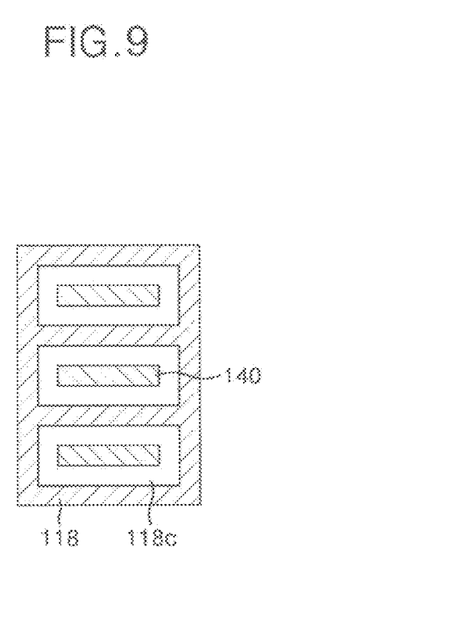
FIG. 9 is a layout of a pixel electrode and a floating electrode according to an exemplary embodiment of the present invention.

Alternatively, the pixel electrode 118 and the floating electrode 140 may be configured to have the structure shown in FIG. 9. Referring to FIG. 9, the pixel electrode 118 is provided with a plurality of floating electrode holes 118c. A plurality of the floating electrode holes 118c is arranged parallel or non-parallel with each other to be spaced apart from each other. An island type floating electrode 140 is provided within each of a plurality of the floating electrode holes 118c.

The touch sensor 120 of the present embodiment includes a first touch conductive line 121, a second touch conductive line 122, and a conductive spacer 126. The first touch conductive line 121 is arranged parallel with the gate line 111 and decides a coordinate value in a vertical direction. The second touch conductive line 122 is arranged parallel with the data line 112 and decides a coordinate value in a horizontal direction. The first and second touch conductive lines 121 and 122 may be directly connected to each other by a conductive spacer 126. Alternatively, the first and second touch conductive lines 121 and 122, as shown in FIG. 6, may be connected to each other via the first and second touch pads 123 and 124.

In this case, the first touch pad 123 is connected to the first touch conductive line 121. The first touch pad 123, as shown in FIG. 8, includes a first lower touch pad 123a and a first upper touch pad 123b. The second touch pad 124 is connected to the second touch conductive line 122 and includes a second lower touch pad 124a and a second upper touch pad 124b. Preferably, the first and second upper touch pads 123b and 124b are arranged at the same height to enhance sensitivity of the touch sensor 120.

The conductive spacer 126 and the gate shielding line 130 are substantially the same as explained in the description of the first embodiment of the present invention, which will not be re-explained in the following description.

Figure 10:
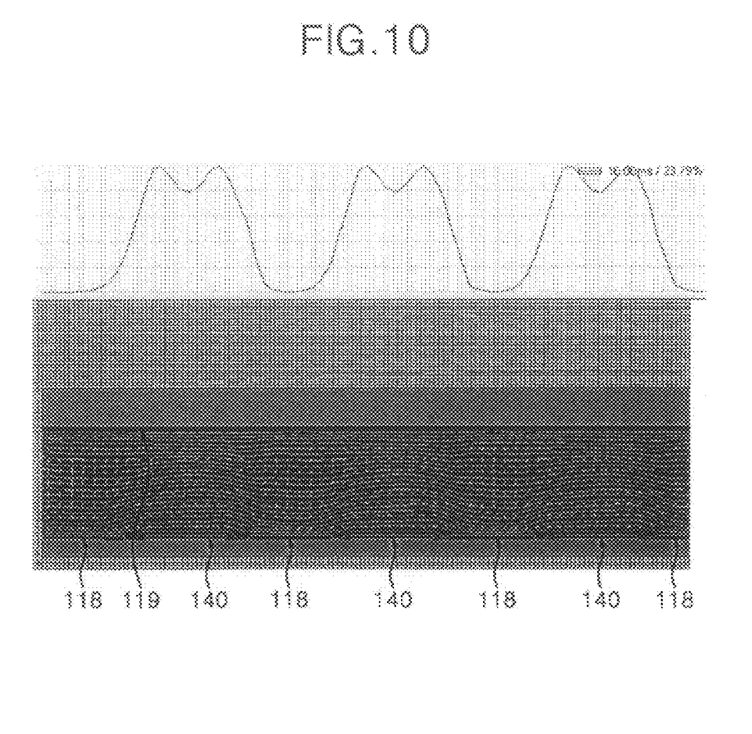
FIG. 10 is a graph of a simulation result of an electric field generation in an LCD according to the present invention.

FIG. 10 is a graph of a simulation result of an electric field generation in an LCD device according to the present invention.

Referring to FIG. 10, it is observed that an electric field for rotating liquid crystals is generated between the pixel electrode 118 and the floating electrode 140. Hence, it is able to enhance an aperture ratio by forming the common electrode 119 on the opposing substrate 102 without a common electrode pad.

Accordingly, the present invention provides the following effects or advantages.

First of all, a lateral field generated between a gate line and a common electrode can be effectively restricted by a gate shielding line, whereby light leakage can be effectively prevented without increasing a width of a black matrix.

Secondly, the present invention is able to generate a horizontal field with a floating electrode by providing a common electrode to an opposing substrate, thereby avoiding reducing an aperture ratio.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a display substrate having gate and data lines arranged in a matrix format and an image display device connected to the gate and data lines;

an opposing substrate bonded to the display substrate with liquid crystals disposed therebetween;

a touch sensor operated by a pressurization of the opposing substrate; and a gate shielding line arranged parallel with the gate line on the opposing substrate and receiving a voltage to cut off an electric field caused by the gate line.

2. The liquid crystal display device of claim 1, wherein the liquid crystals are horizontal electric field type liquid crystals.

3. The liquid crystal display device of claim 2, wherein the image display device comprises:

a common electrode receiving a common voltage;

a thin film transistor connected to the gate and data lines; and a pixel electrode connected to the thin film transistor to form an electric field with the common electrode.

4. The liquid crystal display device of claim 3, wherein the touch sensor comprises:

a first touch conductive line arranged parallel with the data line;

a second touch conductive line arranged parallel with the gate line to be insulated from the first touch conductive line;

a first touch pad connected to the first touch conductive line;

a second touch pad connected to the second touch conductive line to be arranged in the vicinity of the first touch pad; and a conductive spacer electrically connecting the first and second touch pads to each other by a pressurization of the opposing substrate to supply a touch signal.

5. The liquid crystal display device of claim 4, wherein the conductive spacer comprises:

a spacer formed on the opposing substrate to be projected in a direction of the display substrate; and a conductive layer coated on a surface of the spacer.

6. The liquid crystal display device of claim 5, wherein the gate shielding line has a width of 2~4 µm.

7. The liquid crystal display device of claim 4, wherein gate shielding lines are provided to both sides of the gate line.

8. The liquid crystal display device of claim 4, wherein the gate shielding line is provided between the gate line and the common electrode.

9. The liquid crystal display device of claim 8, wherein the gate shielding line overlaps a part of the gate line.

10. The liquid crystal display device of claim 4, further comprising a common voltage applying means for applying the voltage to the gate shielding line, wherein the voltage is the common voltage.

11. The liquid crystal display device of claim 10, wherein the common voltage applying means is provided to a peripheral area of the opposing substrate.

12. A liquid crystal display device comprising:

a display substrate having gate and data lines arranged in a matrix format and a thin film transistor connected to the data and data lines;

an opposing substrate bonded to the display substrate with liquid crystals disposed therebetween, the opposing substrate having a common electrode;

a touch sensor operated by a pressurization of the opposing substrate;

a pixel electrode formed on the display substrate and connected to the thin film transistor to receive a pixel voltage;

a floating electrode formed on the display substrate to be separated from the pixel electrode;

a gate shielding line arranged parallel with the gate line on the opposing substrate to cut off an electric field caused by the gate line;

a common voltage applying means for applying a common voltage to the gate shielding line, wherein the touch sensor comprises:

a first touch conductive line formed on the display substrate, the first touch conductive line being parallel with the data line;

a second touch conductive line formed on the opposing substrate by being insulated from the first touch conductive line, the second touch conductive line being parallel with the gate line; and a conductive spacer electrically connecting the first and second touch conductive lines to each other by a pressurization of the opposing substrate to supply a touch signal, and wherein gate shielding lines are provided to both sides of the gate line.

13. The liquid crystal display device of claim 12, wherein the liquid crystals are horizontal electric field type liquid crystals.

14. The liquid crystal display device of claim 12, wherein the pixel electrode is provided with a floating electrode hole and wherein the floating electrode is provided in an island shape within the floating electrode hole to be spaced apart from the pixel electrode.

15. The liquid crystal display device of claim 12, wherein the pixel electrode comprises a plurality of leg portions arranged parallel with and spaced apart from each other and a connecting portion connecting the plurality of leg portions to each other, and wherein the floating electrode comprises a plurality of island type electrodes formed between the leg portions and spaced apart from the pixel electrode.

16. The liquid crystal display device of claim 15, wherein a plurality of the island type electrodes is electrically connected to each other.

17. The liquid crystal display device of claim 12, wherein the gate shielding line is provided between the gate line and the common electrode.

18. The liquid crystal display device of claim 12, wherein the gate shielding line overlaps a part of the gate line.

* * * * *